US006529347B2

(12) United States Patent
Hipwell et al.

(10) Patent No.: US 6,529,347 B2
(45) Date of Patent: Mar. 4, 2003

(54) DISC DRIVE SLIDER HAVING TEXTURED PADS

(75) Inventors: Mary C. Hipwell, Minneapolis, MN (US); Jason W. Riddering, Prior Lake, MN (US); Jorge V. Hanchi, Minneapolis, MN (US); Lance E. Stover, Eden Prairie, MN (US); Timothy W. Stoebe, Minnetonka, MN (US); Brian W. Karr, Savage, MN (US); Jianxin Zhu, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/939,174

(22) Filed: Aug. 24, 2001

(65) Prior Publication Data

US 2002/0060982 A1 May 23, 2002

Related U.S. Application Data

(60) Provisional application No. 60/239,967, filed on Oct. 13, 2000.

(51) Int. Cl.⁷ ................................................ G11B 5/60
(52) U.S. Cl. ............................ 360/236.6; 360/236.9
(58) Field of Search .................... 360/235.8, 236.6, 360/236.8, 237

(56) References Cited

U.S. PATENT DOCUMENTS

| | | | |
|---|---|---|---|
| 3,754,104 A | 8/1973 | Piper et al. | 179/100.2 |
| 4,034,412 A | 7/1977 | Smith | 360/103 |
| 4,327,387 A | 4/1982 | Plotto | 360/103 |
| 4,692,832 A | 9/1987 | Bandara et al. | 360/137 |
| 4,757,402 A | 7/1988 | Mo | 360/103 |
| 4,853,810 A | 8/1989 | Pohl et al. | 360/103 |
| 4,893,204 A | 1/1990 | Yamada et al. | 360/103 |
| 4,901,185 A | 2/1990 | Kubo et al. | 360/104 |

(List continued on next page.)

FOREIGN PATENT DOCUMENTS

| | | |
|---|---|---|
| EP | 0 442 660 A2 | 8/1991 |
| EP | 0 644 534 | 9/1994 |
| EP | 0 731 453 A1 | 9/1996 |
| EP | 1 037 202 A2 | 9/2000 |
| JP | 54-23517 | 2/1979 |
| JP | 56-107363 | 8/1981 |
| JP | 58-66995 | 4/1983 |
| JP | 59-193580 | 11/1984 |
| JP | 4-245054 | 9/1992 |
| JP | 8-69674 | 3/1996 |
| JP | 08-069674 | 3/1996 |
| JP | 08-212740 | 8/1996 |
| JP | 8-279132 | 10/1996 |
| JP | 08-287440 | 11/1996 |
| JP | 11-25629 | * 1/1999 |
| WO | WO 99/00792 | 1/1999 |

OTHER PUBLICATIONS

Technical Disclosure Bulletin, "Magnetic Disk Storage System With Structured Magnetic Head Slider", by IBM Corp., vol. 27, No. 10A, (Mar. 1985) pp. 5820–5821.

(List continued on next page.)

Primary Examiner—Jefferson Evans
(74) Attorney, Agent, or Firm—Westman, Champlin & Kelly

(57) ABSTRACT

A disc drive slider includes a slider body and a rail formed on the slider body. The rail includes a bearing surface which faces a surface of a disc. A textured portion is formed on the bearing surface of the rail. Pads are deposited on the textured portions. The pads operate to reduce stiction, dynamic friction, and the likelihood of damage to the slider or the surface of the disc due to contact therebetween.

18 Claims, 5 Drawing Sheets

U.S. PATENT DOCUMENTS

| | | | |
|---|---|---|---|
| 5,010,429 A | 4/1991 | Taguchi et al. | 360/103 |
| 5,012,572 A | 5/1991 | Matsuzawa et al. | 29/603 |
| 5,020,213 A | 6/1991 | Aronoff et al. | 29/603 |
| 5,034,828 A | 7/1991 | Ananth et al. | 360/75 |
| 5,052,099 A | 10/1991 | Taguchi et al. | 29/603 |
| 5,063,712 A | 11/1991 | Hamilton et al. | 51/67 |
| 5,067,037 A | 11/1991 | Ananth et al. | 360/103 |
| 5,079,657 A | 1/1992 | Aronoff et al. | 360/103 |
| 5,162,073 A | 11/1992 | Aronoff et al. | 156/625 |
| 5,200,867 A | 4/1993 | Albrecht et al. | 360/103 |
| 5,202,803 A | 4/1993 | Albrecht et al. | 360/97.02 |
| 5,267,104 A | 11/1993 | Albrecht et al. | 360/97.02 |
| 5,278,711 A | 1/1994 | Gregory et al. | 360/103 |
| 5,285,337 A | 2/1994 | Best et al. | 360/97.02 |
| 5,323,282 A | 6/1994 | Kanai et al. | 360/103 |
| 5,345,353 A | 9/1994 | Krantz et al. | 360/103 |
| 5,347,412 A | 9/1994 | Nitta et al. | 360/103 |
| 5,374,463 A | 12/1994 | Bethune et al. | 428/64 |
| 5,386,666 A | 2/1995 | Cole | 451/5 |
| 5,388,020 A | 2/1995 | Nakamura et al. | 360/135 |
| 5,396,386 A | 3/1995 | Bolasna et al. | 360/103 |
| 5,396,387 A | 3/1995 | Murray | 360/103 |
| 5,418,667 A | 5/1995 | Best et al. | 360/103 |
| 5,420,735 A | 5/1995 | Haines | 360/103 |
| 5,424,888 A | 6/1995 | Hendriks et al. | 360/103 |
| 5,490,027 A | 2/1996 | Hamiton et al. | 360/104 |
| 5,499,149 A | 3/1996 | Dovek | 360/103 |
| 5,508,861 A | 4/1996 | Ananth et al. | 360/103 |
| 5,515,219 A | 5/1996 | Ihrke et al | 360/103 |
| 5,526,204 A | 6/1996 | French et al. | 360/97.02 |
| 5,537,273 A | 7/1996 | Hendriks et al. | 360/103 |
| 5,550,691 A | 8/1996 | Hamilton | 360/103 |
| 5,550,693 A | 8/1996 | Hendriks et al. | 360/103 |
| 5,550,696 A | 8/1996 | Nguyen | 360/135 |
| 5,557,488 A | 9/1996 | Hamilton et al. | 360/104 |
| 5,569,506 A | 10/1996 | Jahnes et al. | 428/65.3 |
| 5,572,386 A | 11/1996 | Ananth et al. | 360/103 |
| 5,606,476 A | 2/1997 | Chang et al. | 360/103 |
| 5,612,838 A | 3/1997 | Smith et al. | 360/102 |
| 5,625,512 A | 4/1997 | Smith | 360/103 |
| 5,626,941 A | 5/1997 | Ouano | 428/141 |
| 5,673,156 A | 9/1997 | Chen et al. | 360/97.01 |
| 5,695,387 A | 12/1997 | Moravec et al. | 451/56 |
| 5,726,831 A | 3/1998 | White | 360/103 |
| 5,768,055 A | 6/1998 | Tian et al. | 360/103 |
| 5,774,303 A | 6/1998 | Teng et al. | 360/103 |
| 5,796,551 A | 8/1998 | Samuelson | 360/103 |
| 5,805,380 A | 9/1998 | Ishihara et al. | 360/13 |
| 5,815,346 A | 9/1998 | Kimmal et al. | 360/103 |
| 5,841,608 A | 11/1998 | Kasamatsu et al. | 360/103 |
| 5,864,452 A | 1/1999 | Hirano et al. | 360/122 |
| 5,870,250 A | 2/1999 | Bolasna et al. | 360/103 |
| 5,870,251 A | 2/1999 | Boutaghou | 360/103 |
| 5,872,686 A | 2/1999 | Dorius et al. | 360/103 |
| 5,883,171 A | 3/1999 | Matsushita et al. | 216/22 |
| 5,886,856 A | 3/1999 | Tokuyama et al. | 360/103 |
| 5,889,635 A | 3/1999 | Sato | 360/103 |
| 5,949,612 A | 9/1999 | Gudenman et al. | 360/97.01 |
| 5,967,880 A | 10/1999 | Major | 451/36 |
| 5,991,118 A | 11/1999 | Kasamatsu et al. | 360/103 |
| 5,994,035 A | 11/1999 | Tsukamoto et al. | 430/320 |
| 6,040,958 A | 3/2000 | Yamamoto et al. | 360/103 |
| 6,084,753 A | 7/2000 | Gillis et al. | 360/128 |
| 6,118,635 A | 9/2000 | Maruyama et al. | 360/246.2 |
| 6,172,850 B1 | 1/2001 | Ishihara | 360/235.2 |
| 6,188,547 B1 | 2/2001 | Gui et al. | 360/236.5 |
| 6,212,042 B1 | 4/2001 | Gui et al. | 360/236.6 |
| 6,297,932 B1 * | 10/2001 | Liu | 360/235.8 |
| 6,381,090 B1 * | 4/2002 | Suzuki et al. | 360/97.01 |
| 6,396,663 B1 * | 5/2002 | Kasamatsu | 360/235.8 |

OTHER PUBLICATIONS

"Stiction Free Slider for the Smooth Surface Disk", by Y. Kasamatsu et al., *IEEE Transactions on Magnetics,* vol. 31, No. 6, (Nov. 1995), pp. 2961–2963.

"A Stiction Model for a Head–Disk Interface of a Rigid Disk Drive", by J. Gui et al., *J. Appl. Phys.,* vol. 78, No. 6, (Sep. 15, 1995), pp. 4206–4217.

"A Model for Mechanical Seals with Regular Microsurface Structure", by I. Etsion et al., *Tribology Transactions,* vol. 39, (1996), pp. 677–683.

"Increasing Mechanical Seals Life With Laser–Textured Seal Faces", by G. Halperin et al., *Surface Surtech Technologies Ltd.,* (Sep. 1997), pp. 1–12.

"Tribology of Contacting Head–Disk Interfaces" published in the *Proceedings of the Symposium on Interstate Technology Towards 100 Gbit/in 2,* TRIB–vol. 9, ASME, pp. 17–22 (Oct./1999); J. Hanchi, A.A. Polycarpou and Z. Boutaghou.

* cited by examiner

FIG. 5.1
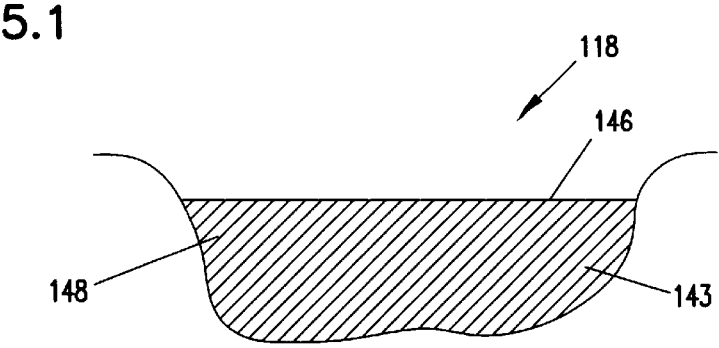
FIG. 5.2
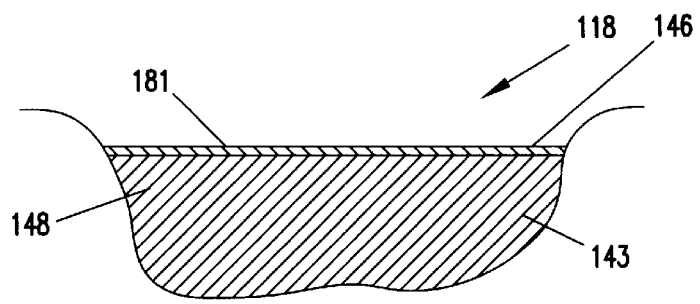
FIG. 5.3
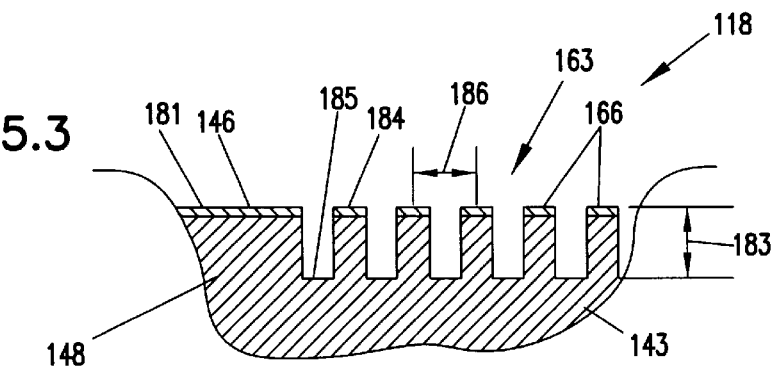
FIG. 5.4
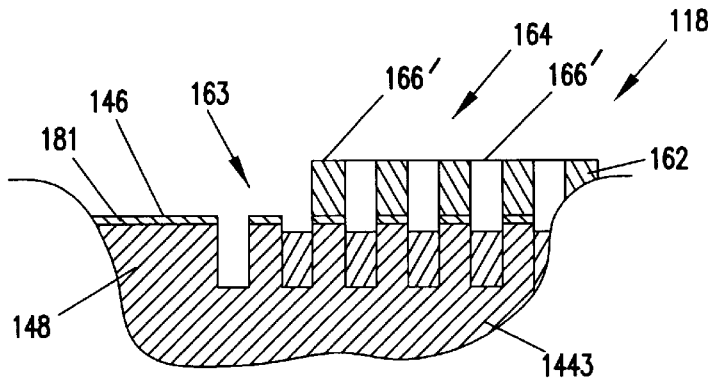

DISC DRIVE SLIDER HAVING TEXTURED PADS

CROSS-REFERENCE TO RELATED APPLICATION

The present invention claims priority to U.S. Provisional Application No. 60/239,967, filed Oct. 13, 2000 and entitled "MICRO-TEXTURED PADS FOR REDUCED STICTION AND DYNAMIC FRICTION."

FIELD OF THE INVENTION

The present invention relates to disc storage systems for storing information. More particularly, the present invention relates to an improved disc drive slider design that includes pads having a contact surface that reduces stiction and dynamic friction between the slider and a surface of a disc.

BACKGROUND OF THE INVENTION

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the disc surfaces of the discs under control of electronic circuitry. The actuator mechanism includes an actuator arm and a suspension assembly. The slider is coupled to the suspension assembly through a gimbaled attachment. The suspension provides a load force to the slider which forces the slider toward the disc surface.

The slider includes a bearing surface, which faces the disc surface. As the disc rotates, the disc drags air under the slider and along the bearing surface in a direction approximately parallel to the tangential velocity of the disc. As the air passes beneath the bearing surface of the slider, air compression along the airflow path causes the air pressure between the disc and the bearing surface of the slider to increase, which creates a hydrodynamic lifting force that counteracts the load force and causes the slider to lift and "fly" in close proximity to the disc surface and enable the transducing head carried by the slider to perform read and write operations. The gimbaled attachment to the suspension assembly allows the slider to pitch and roll while following the topography of the disc.

Demands for increased disc storage capacity have led to lower slider fly heights and smoother disc surfaces. Unfortunately, the development of ultra-low flying sliders is impaired by a phenomenon called stiction. Stiction is caused by static friction and viscous sheer forces which cause the slider to stick to the disc surface after periods of non-use. Stiction can be overcome by the spindle motor provided that sufficient torque can be produced. However, the slider and/or the disc can be damaged when the slider is freed from the disc surface. In addition, dynamic friction between the disc surface and the slider can also cause problems in the form of reduced modulation on the read and write signals produced by the transducers.

Contact start/stop (CSS) disc drives operate with the slider in contact with the disc surface during start and stop operations when there is insufficient disc rotational speed to maintain the bearing that allows the slider to fly. To alleviate stiction problems, some CSS disc drives provide a dedicated landing zone near the inner diameter of the disc by generating, in a controlled fashion, asperities or texture, on the disc surface. The texture acts to reduce the area of contact at the slider-disc interface. Although this solution reduces the likelihood of disc drive failure due to stiction, there is also a reduction in the area of the disc surface that can be used for data storage. Furthermore, the presence of the asperities on the media surface can enhance the chance of slider-media contact during operation and thereby sets the limit to the true attainment of ultra-low flying sliders.

Another method of alleviating problems with stiction and dynamic friction is to include pads on the bearing surfaces of the slider. The pads act to reduce the area of contact with the disc surface and thereby reduce the stiction and dynamic friction that is encountered. Such pads are typically formed of diamond-like carbon (DLC). Unfortunately, DLC pads alone have been shown to lead to stiction and dynamic friction levels above reliability limits in systems using ultra high areal density interfaces which require the use of extremely smooth disc surfaces (e.g. Ra<3A).

Another method of alleviating stiction problems associated with CSS disc drives is disclosed in U.S. Pat. No. 5,991,118, which issued to Kasamatsu et al. The Kasamatsu Patent modifies the pads of a slider by etching the contact surface of the pads to thereby further reduce the contact area between the slider and the disc surface. The etched pattern on the pad has a depth that is less than the thickness of the pad. As the etched portion of the pad wears, the texture formed on the contact surface by the etched pattern deteriorates until it is completely worn away. Once the etched surface is eliminated, the slider acts in the same manner as the padded slider described above. As a result, this method will ultimately lead to stiction and dynamic friction levels that are above reliability limits in systems using ultra high aerial density interfaces.

Yet, another method for reducing problems caused by stiction is to use a ramp load or ramp load/unload disc drive. Ramp load disc drives eliminate the need of having to "park" the slider on the disc surface by using a ramp, from which the slider is loaded above the disc surface and unloaded from the disc surface. The ramp is generally adapted to hold the slider by the suspension and is typically located adjacent the outer diameter of the disc. Prior to shutting the drive down, the actuator mechanism unloads the flying slider from the disc surface by rotating the suspension onto the ramp. Once the slider is unloaded, the disc is allowed to slow its rotational velocity from the full operating speed and the drive can be shut down. At start up, the actuator mechanism delays loading the slider onto the disc surface until the rotational velocity of the disc reaches the full operating speed. Although ramp load disc drives appear to be a solution to many of the problems associated with CSS drives, such as the need for a dedicated landing zone, ramp load disc drives have their drawbacks.

One problem that is encountered in ramp load disc drives is that the slider can contact the disc surface during ramp load operations when the required air bearing beneath the slider is not sufficiently formed. This contact is undesirable due to the possibility of damaging the disc surface and/or the slider, which could result in data loss and disc drive failure. One partial solution to this is to provide a dedicated loading zone at the outer diameter of the disc surface where no data is written. Unfortunately this solution decreases in the effective data storage area of the drive and does not solve the problem of potential damage to the slider. Ramp load disc drives can also encounter problems with stiction. This can occur, for example, when power to the disc drive is interrupted while the slider is flying over the disc surface or when the suspension is knocked off the ramp.

There exists a need for an improved disc drive slider design that reduces stiction and dynamic friction between the slider and the disc surface to provide reliable operation with ultra-smooth disc surfaces while further reducing the likelihood of damage caused by contact between the slider and a disc surface.

SUMMARY OF THE INVENTION

The present invention is directed to a disc drive slider that solves the problems discussed above. The slider includes a slider body and a rail formed on the slider body. The rail has a bearing surface that faces a surface of a disc. A textured portion is formed on the bearing surface of the rail. A pad is deposited on the textured portion and operates to reduce stiction, dynamic friction, and the likelihood of damage to the slider or the disc surface due to contact therebetween.

These and other features and benefits would become apparent with a careful review of the following drawings and the corresponding detailed description.

BRIEF DESCRIPTION OF THE DRAWINGS

FIGS. 5.1–5.4 show partial cross-sectional views of a slider taken along line 5—5 of FIG. 2, in accordance with embodiments of the invention.

DETAILED DESCRIPTION OF ILLUSTRATIVE EMBODIMENTS

Figure 1:
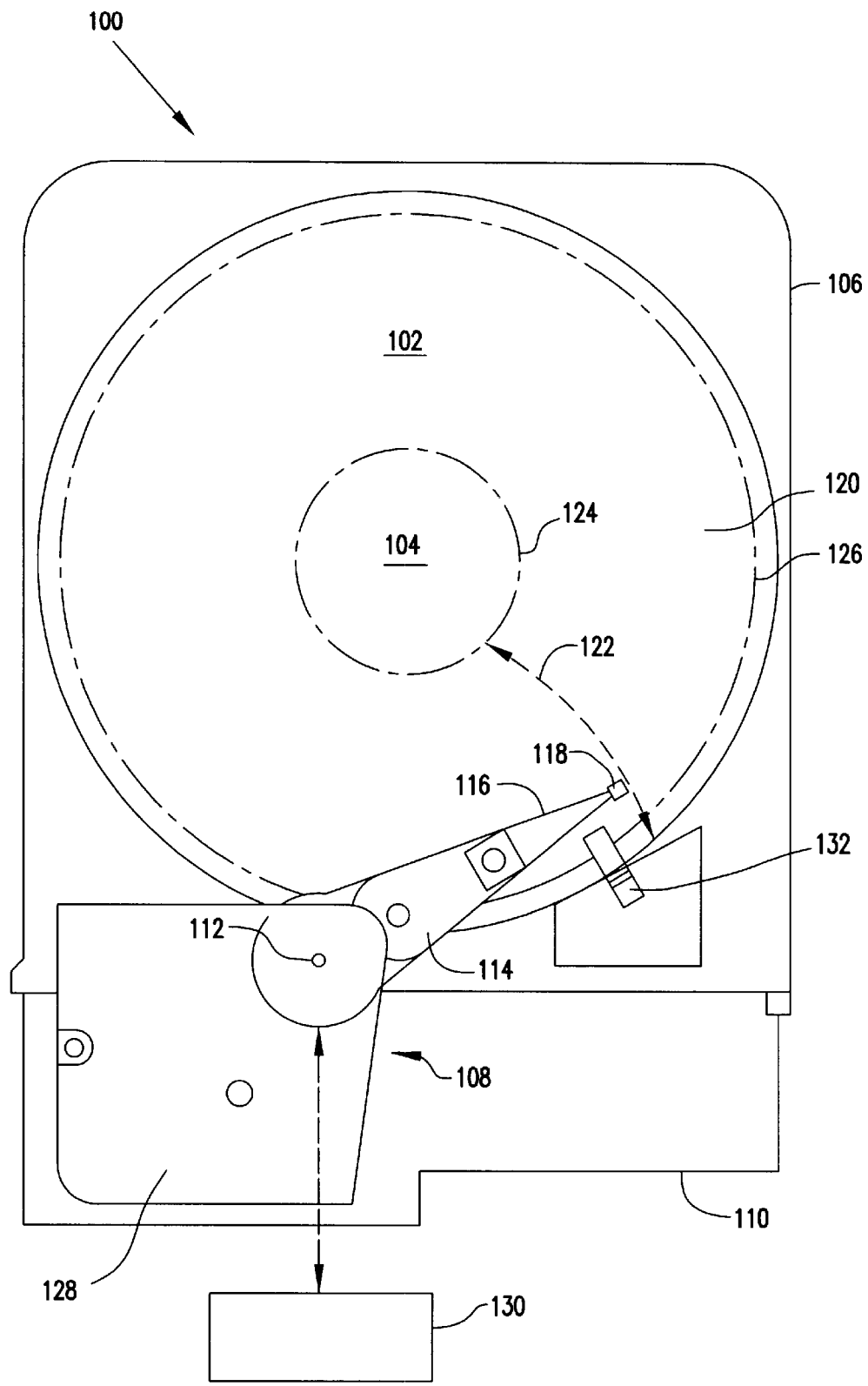
FIG. 1 is a top view of a disc drive storage system depicting an optional ramp in accordance with embodiments of the invention.

FIG. 1 is a top view of a disc drive 100 in accordance with embodiments of the present invention. Disc drive 100 includes a magnetic disc 102 mounted for rotational movement about an axis 104 and driven by a spindle motor (not shown). The components of disc drive 100 are contained within a housing that includes base 106 and a cover (not shown). Disc drive 100 also includes an actuator mechanism 108 mounted to a base plate 110 and pivotally moveable relative to disc 104 about axis 112. In an alternative embodiment, actuator mechanism 108 is a linear actuator. Actuator mechanism 108, includes actuator arm 114 and suspension assembly 116. Slider 118 is coupled to suspension assembly 116 through a gimbaled attachment that allows slider 118 to pitch and roll as it rides on a bearing above surface 120 of disc 102. Slider 118 is designed in accordance with the embodiments set forth herein and supports a transducer to form a head for reading and writing information on disc 102. Actuator mechanism 108 is adapted to rotate slider 118 along arcuate path 122 between an inner diameter 124 and an outer diameter 126 of disc 102. A cover 128 can cover a portion of actuator mechanism 108.

Drive controller 130 controls actuator mechanism 108 through a suitable connection. Drive controller 130 can be mounted within disc drive 100 or located outside of disc drive 100. During operation, drive controller 130 receives position information indicating a portion of disc 102 to be accessed. Drive controller 130 receives the position information from an operator, from a host computer, or from another suitable controller. Based on the position information, drive controller 130 provides a position signal to actuator mechanism 108. The position signal causes actuator mechanism 108 to pivot about axis 112. This, in turn, causes slider 118 to move radially over disc surface 120 along path 122. Once the transducer is appropriately positioned, drive controller 130 then executes a desired read or write operation.

Figure 2:
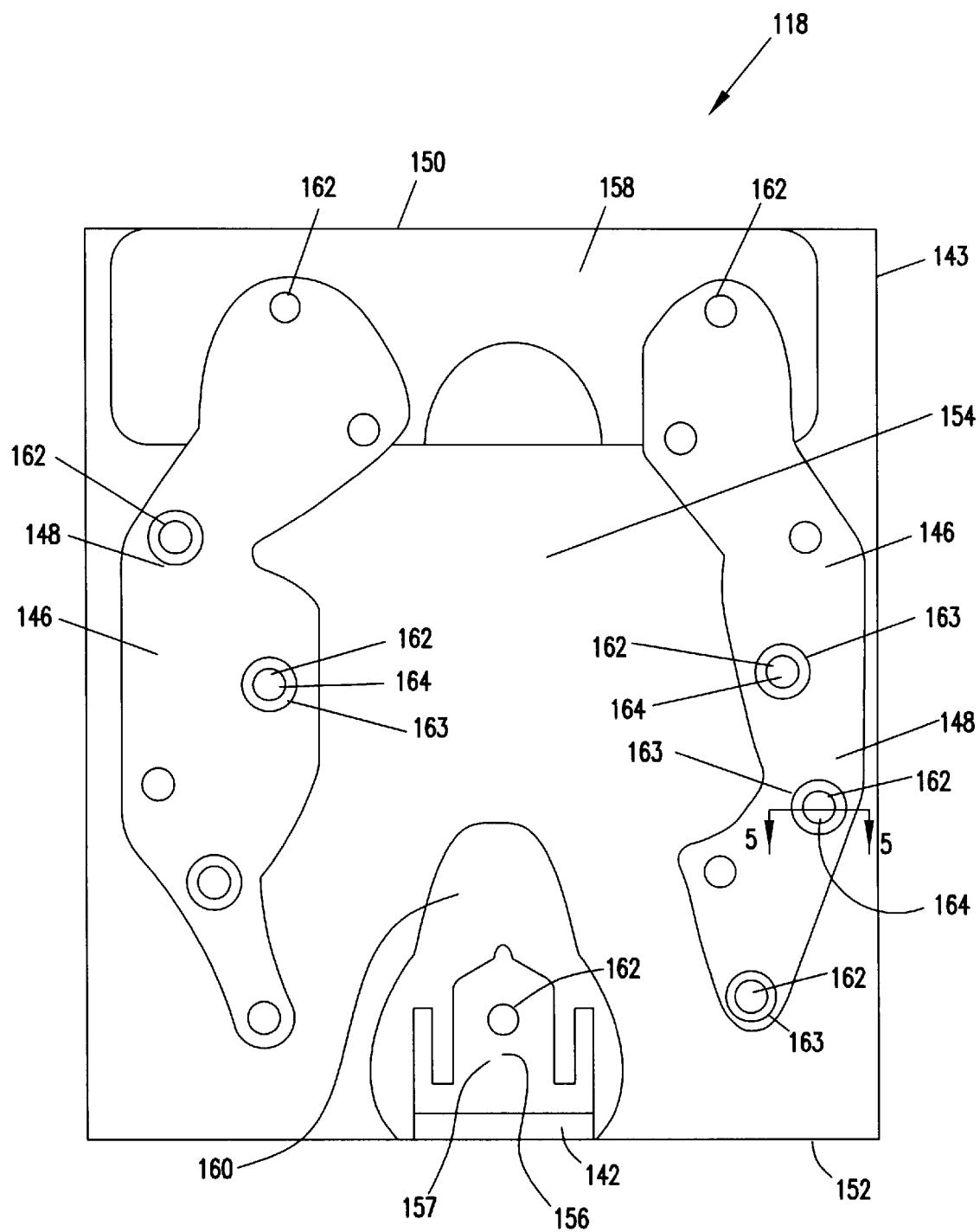
FIG. 2 is a bottom plan view of the slider in accordance with the various embodiments of the invention.

FIG. 2 is a bottom plan view of an example of a slider 118 in accordance with various embodiments of the invention. Slider 118 is adapted to support a transducer 142 above a surface 120 of a disc 102 (FIG. 1). Slider 118 generally includes a slider body 143, rails 148, and bearing surfaces 146 formed on rails 148. Rails 148 extend between a leading slider edge 150 and a trailing slider edge 152. Rails 148 are preferably truncated prior to trailing edge 152 to minimize the fly height of transducer 142. Rails 148 are disposed about a central recessed portion 154, which forms a sub-ambient pressure cavity when slider 118 is flying above disc surface 120. Slider 118 can also include a center rail 156 that supports transducer 142 and includes a bearing surface 157. A recessed step or taper 158 can be located at leading edge 150 and has a depth that is between the depth of recessed portion 154 and bearing surfaces 146. Step 158 begins the compression of air under slider 140 to assist in forming the air bearing under bearing surfaces 146. Center rail 156 can also include a step (or taper) 160 to similarly assist in the formation of an air bearing under bearing surface 157. Slider 118 is intended to be one example of a suitable slider design with which embodiments of the present invention may be used. Accordingly, embodiments of the present invention can also be used with sliders having one or multiple rails, for example.

During operation, as disc 102 rotates, air (and/or a lubricant) is dragged under the slider 118 and along bearing surfaces 146 of slider 118 in a direction approximately parallel to the tangential velocity of disc 102. As the air passes beneath bearing surfaces 146, air compression along the air flow path causes the air pressure between disc surface 120 and bearing surfaces 146 to increase, which creates a hydrodynamic lifting force that counteracts a load force provided by suspension 116 and causes slider 118 fly above and in close proximity to disc surface 120. The bearing is typically formed when the tangential velocity of disc 102, at the location of slider 118, reaches a minimum operational speed. Thus, when the tangential velocity of disc 102, at the location of slider 118, is less than the minimum operational speed, slider 118 is in contact with disc surface 120.

Disc drive 100, shown in FIG. 1, can be configured to operate as either a contact start/stop (CSS) disc drive or a ramp load disc drive. As a contact start/stop (CSS) disc drive, slider 118 contacts the disc surface 120 during start and stop operations when the tangential velocity of the disc is below the minimum operational speed. For the ramp load configuration, disc drive 100 includes a ramp 132 or other suitable support mechanism to load slider 118 onto, and unload slider 118 from, disc surface 120 during power-up and power-down operations. Here, when disc drive 100 is to be powered down (where the disc decelerates to a non-rotating state), actuator mechanism 108, under the control of drive controller 130, rotates suspension assembly 116 to engage ramp 132 at outer diameter 126 before the tangential speed of disc 102 at the location of slider 118 drops below the minimum operational speed. Ramp 132 is configured to support suspension 116 such that slider 118 is held above disc surface 120. Likewise, when disc drive 100 is powered up, disc 102 accelerates toward a full operating rotational velocity at which disc 102 has a tangential velocity at outer diameter 126 that is larger than the minimum operational speed. As the disc 102 is accelerating, drive controller 130 controls actuator mechanism 108 to rotate suspension 116 off ramp 132 and position slider 118 over disc surface 120.

Referring again to FIG. 2, slider 118 includes a plurality of pads 162 which are deposited on textured portions 163 of bearing surfaces 146. Pads 162 include a contact surface 164 that corresponds to the textured portion 163, on which they are deposited. Contact surface 164 of pads 162 reduce stiction and dynamic friction between slider 118 and disc surface 120 to facilitate the use of ultra-smooth disc surfaces 120 (e.g. discs having a roughness Ra<3 angstroms (Å)), which allow sliders 118 to fly in close proximity to disc 102, as is required in disc drives 100 having high areal density recordings. Additionally, pads 162 of slider 118 reduce the likelihood of damage to disc surface 120 caused by contact with slider 118 while slider 118 flies in close proximity to disc surface 120 and during ramp load operations. As a result, pads 162 are ideal for use in CSS and ramp load disc drives 100 utilizing ultra-smooth discs 102 having high areal density recordings.

Figure 3:
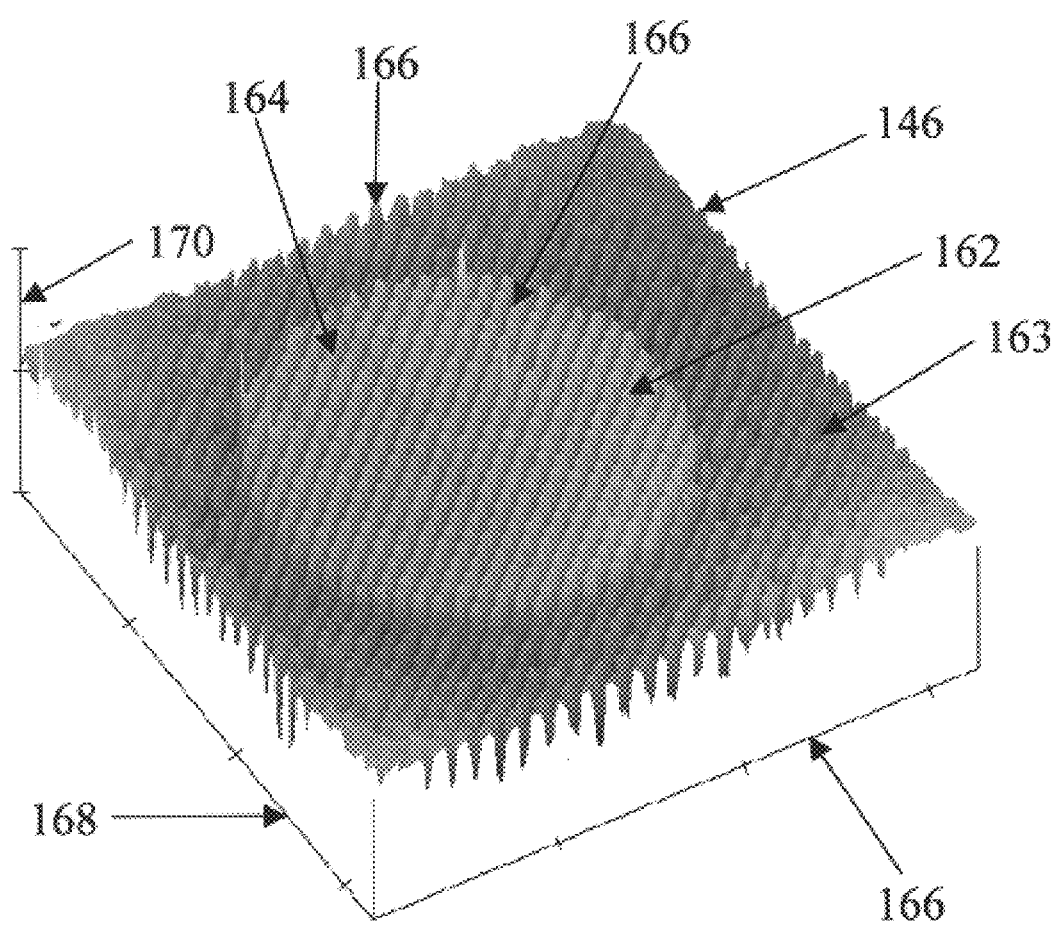
FIG. 3 is a magnified perspective view of a portion of a textured portion and contact surface of a slider, in accordance with an embodiment of the invention.

FIG. 3 is an extreme close up view, exemplary of an Atomic Force Microscopy (AFM) analysis of a pad 162 formed on a bearing surface 146, in accordance with embodiments of the present invention. Units along x- and y-axes 166 and 168, respectively, are 20 micrometers ($\mu$m)/ division, while units in the z-axis 170 are 100 nanometers (nm) /division. In one embodiment of the invention, textured portion 163 includes a plurality of protuberances 166, an example of which are shown in FIG. 3. The cross-sectional shape of protuberances 166 can be circular, rectangular, oval, or any other desired shape. The dimensions of protuberances 166 and the spacing between individual protuberances 166 can be adjusted as desired, but will be limited based upon the particular fabrication method that is used. For example, conventional lithography can be used to form a textured surface 166 that consists of discrete 1–10 $\mu$m features, whereas interference lithography allows for discrete features on the order of 100 nm to be formed. Other methods known in the art can also be used to form the desired textured portion 163, such as reactive ion etching and milling processes. In one embodiment, protuberances 166 have a diameter of approximately 1 $\mu$m, a pitch of approximately 2 $\mu$m, and a height of approximately 50 nm.

Pads 162 are deposited on texture portion 163 of bearing surfaces 146. Pads 162 are preferably formed of diamond-like carbon (DLC) due to its mechanical and chemical compatibility with disc 102 and because it prevents disc lubrication breakdown caused by interaction with the material forming body 143 of slider 118. Pads 162 typically have a cross-sectional area of about 50 square $\mu m^2$ to about 5,000 $\mu m^2$ and a height of approximately 300 Å. The height, width, and shape of pads 162 can be made compatible with needed clearances for proper disc drive operation. Pads 162 include a contact surface 164 that substantially corresponds to the textured portion 163 on which it is deposited. As a result, contact surface 164 includes a plurality of protuberances 166', which correspond to the underlying protuberances 166 of textured portion 163. Thus, protuberances 166' have similar dimensions to protuberances 166 of textured portion 163.

In the preferred embodiment, textured portion 163, and thus also contact surface 164, is formed in accordance with a plasticity index ($\psi$), which is based upon the following relationship:

$$\Psi = \frac{E}{H} = \sqrt{\frac{\sigma}{R}} \qquad \text{Eq. 1}$$

Where E represents a composite or equivalent Young's Modulus of Elasticity, H represents a hardness of the softer material, $\sigma$ is the root mean square of surface heights, and R represents the radius of curvature of asperity summits. The quantity $\sigma/R$ is generally known as a roughness parameter. The value for E can be determined by the relationship:

$$\frac{1}{E} = \frac{(1-V_1^2)}{E_1} + \frac{(1-V_2^2)}{E_2} \qquad \text{Eq. 2}$$

Where v represents Poisson's ratios for contact surface 164 of pads 162 ($v_1$) and disc surface 120 ($v_2$). Similarly, $E_1$ and $E_2$ are the Young's Modulus of Elasticity for contact surface 164 and disc surface 120, respectively.

It has been shown experimentally and via modeling, that the smaller the plasticity index ($\Psi$) is, the smoother the surfaces are. More specifically, when $\Psi<0.6$, there are primarily elastic deformations of the contacting asperities, and friction becomes very high as $\Psi$ decreases to small values. For a $\Psi>1.0$, there are primarily plastic deformations of the contacting asperities, and friction is usually low, but wear is unacceptably high. When the plasticity index is in the range of $0.6<\Psi<1.0$, there are both elastic and plastic deformations of the contacting asperities.

The topography of textured portion 163, and thus contact surface 164, is controlled to achieve a desired value of the plasticity index, and thus friction and wear levels that are consistent with the attainment of superior slider-disc interface durability. Furthermore, optimization of the surface topography can be carried out with respect to the ratio of the real area of contact to the nominal area of contact. As a result, for a prescribed contact pressure, a low ratio of real to nominal area of contact will result in high stresses and thus plastic deformation of the asperities, whereas a very high ratio will guarantee plastic deformation of the asperities, but it may lead to unacceptably high friction values. It is preferable to maintain the plasticity index ($\psi$) that is approximately 0.6, due the importance of durability in the design of pads 162.

Figure 4:
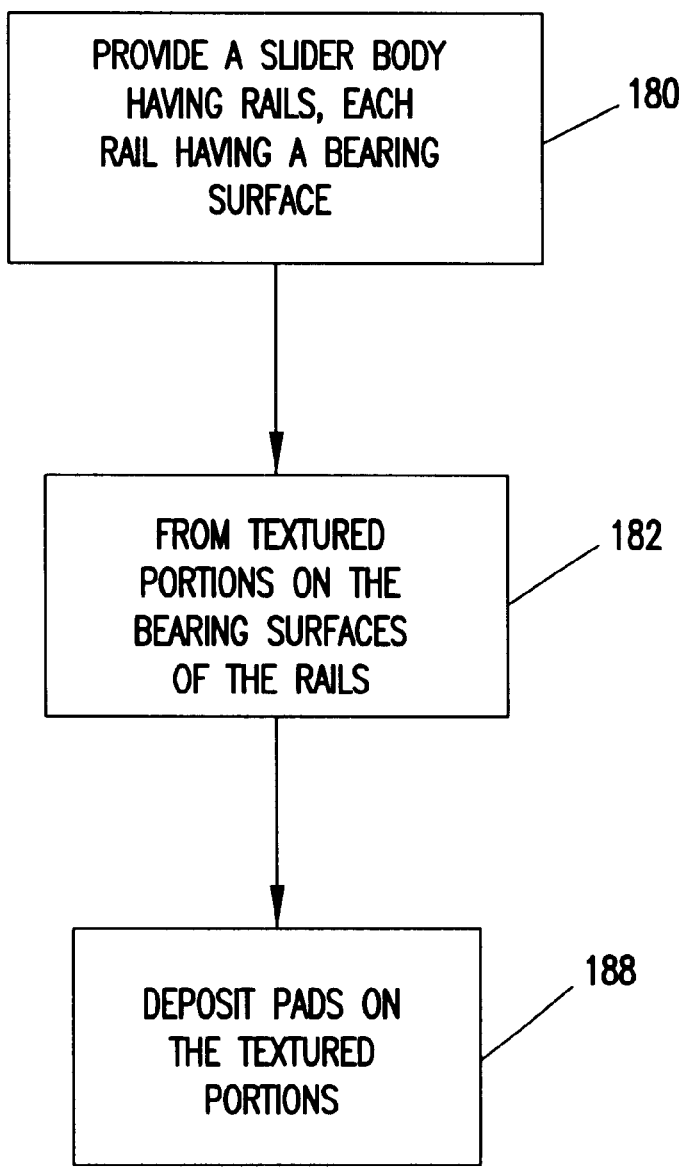
FIG. 4 is a flowchart illustrating a method of fabricating a slider in accordance with an embodiment of the invention.

Referring now to FIGS. 4 and 5.1–5.4, a method of fabricating slider 118 in accordance with an embodiment of the invention, will be discussed. FIG. 4 is a flowchart illustrating the general steps used in the method of fabricating slider 118 and FIGS. 5.1–5.4 are simplified partial cross-sectional views of slider 118 taken along line 5—5 of FIG. 2. Initially, at step 180, a slider body 143 is provided. The slider body 143 includes bearing surfaces 146 formed on rails 148, as shown in FIG. 5.1. In one embodiment, a protective overcoat layer 181 is formed on bearing surfaces 146, as shown in FIG. 5.2. Protective overcoat layer 181 is preferably formed of DLC. At step 182, textured portions 163 are formed on portions of bearing surfaces 146 of rails 148, as shown in FIG. 5.3. Texture portions 163 can be formed using any suitable method, such as photolithography, interference lithography and other suitable methods. Textured portions 163 generally include protuberances 166, each having a height 183. The height 183 and shape of protuberances 166 can be selected to provide the desired plasticity index ($\Psi$). Height 183 is generally measured from peak 184 to valley 185. Additionally, the spacing or pitch 186 between adjacent protuberances 166 can also be selected to provide the desired plasticity index (Ψ). At step 188 of the method, pads 162 are deposited on textured portions 163 as shown in FIG. 5.4. Pad 162 includes a contact surface 164, that corresponds to textured portion 163 on which pad 162 is deposited. As a result, contact surface 164 includes a plurality of protuberances 166', which correspond to protuberances 166 of textured portion 163. Protuberances 166' preferably have a height that is less than the height 183 of protuberances 166, to allow contact surface 164 to be maintained at least to bearing surface 146 as protuberances 166' wear. As a result, this embodiment of the present invention has a longer life span than the pads of the prior art, in which the contact surface has a limited depth and can be worn to a smooth surface resulting in problems with stiction, dynamic friction, and damaging contact between the slider and disc surface 120.

In summary, the present invention relates to a slider (118) that includes at least one rail (148) formed on the slider body (143). The rail (148) includes a bearing surface (146), which includes at least one textured portion (163). The bearing surface (146) of the rail (148) can include a protective overcoat layer (181). A pad (162) is deposited on the textured portion (163) of the bearing surface (146). The pad (162) includes a contact surface (164) that substantially conforms to the textured portion (163) of the bearing surface (146) on which the pad (162) is deposited. In one embodiment, the textured portion (163) is formed in accordance with a plasticity index (Ψ), which is based on Eq. 1 discussed above.

The textured portion (163) generally includes a plurality of protuberances (166). The protuberances (166) of the textured portion (163) are micro-textured having discrete 1–10 micrometer features in one embodiment and are nano-textured having discrete 100–999 nanometer features in another embodiment.

The pad (162) is preferably formed of diamond-like carbon (DLC). Slider (118) can also include one or more pads (162) which are not deposited on a textured portion (163) of the bearing surface (146). As a result, slider (118) can include pads (162) having textured (164) and non-textured contact surfaces.

In another embodiment, a contact start/stop (CSS) disc drive storage system is formed using a slider (118) in accordance with embodiments of the invention. In another embodiment, a ramp load disc drive storage system is formed using a slider (118) in accordance with embodiments of the present invention.

Another aspect of the present invention is directed to a method of fabricating a slider (118) for use in a disc drive storage system (100). The method includes a step (180) of providing a slider body (143) having a rail (148), the rail (148) having a bearing surface (146). Next, a step (182) is performed in which a textured portion (163) is formed on the bearing surface (146) of the rail (148). In a final step (188), a pad (162) is deposited on the textured portion (163) whereby pad (162) includes a contact surface (164) that corresponds to the textured portion (162) on which it is deposited. In one embodiment, the textured portion (163) is formed in accordance with a plasticity index (ψ), which is based on the relationship provided above in Eq. 1.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Accordingly, workers skilled in the art will recognize that changes may be made in form and detail without departing from the spirit and scope of the invention.

What is claimed is:

1. A slider for use in a disc drive storage system, comprising:
   a slider body;
   a rail formed on the slider body having a raised bearing surface;
   a textured portion formed on the bearing surface; and
   a pad deposited on the textured portion of the bearing surface and having a contact surface that corresponds to the textured portion.

2. The slider of claim 1, wherein the textured portion is formed in accordance with a plasticity index (ψ), which is based on the relationship:

$$\Psi = \frac{E}{H}\sqrt{\frac{\sigma}{R}}$$

where E represents a combined Young's Modulus of Elasticity, H represents a hardness of softer material, σ is a root mean square of surface heights, and R represents a radius of curvature of asperity summits.

3. The slider of claim 2, wherein in ψ is within a range of 0.6<ψ<1.0.

4. The slider of claim 1, wherein the textured portion includes a plurality of protuberances.

5. The slider of claim 1, wherein the textured portion includes a plurality of protuberances each having a height, wherein a height of the pads is not greater than the height of the protuberances.

6. The slider of claim 1, wherein the textured portion is micro-textured having discrete 1–10 um features.

7. The slider of claim 1, wherein the textured portion is nano-textured having discrete 100–999 nanometer features.

8. The slider of claim 1, wherein the pad is formed of diamond-like carbon (DLC).

9. The slider of claim 1, including a pad deposited on a non-textured portion of the air bearing surface.

10. The slider of claim 1, including a protective overcoat layer of DLC on the bearing surface of the rails.

11. A contact start/stop (CSS) disc drive storage system including the slider of claim 1.

12. A ramp load disc drive storage system including the slider of claim 1.

13. A method of fabricating a slider for use in a disc drive storage system, comprising steps of:
   (a) providing a slider body having a rail, the rail having a bearing surface;
   (b) forming a textured portion on the bearing surface of the rail; and
   (c) depositing a pad on the textured portion, the pad having a contact surface that corresponds to the textured portion.

14. The method of claim 13, wherein the forming step (b) involves at least one of a photolithographic process, an interference lithographic process, a milling process, and a reactive ion etching process.

15. The method of claim 13, including a step (d) of depositing a pad on a non-textured portion of the bearing surface.

16. A disc drive storage system for storing information on a surface of a rotating disc, comprising:
- a slider for carrying a transducing element proximate a surface of the disc;
- a textured portion formed on a bearing surface of the slider; and
- a pad deposited on the textured portion and having a textured contact surface means for reducing stiction and dynamic friction between the pad and the surface of the disc.

17. The slider of claim 16, wherein the textured pad means is formed in accordance with a plasticity index ($\psi$), which is based on the relationship:

$$\Psi = \frac{E}{H}\sqrt{\frac{\sigma}{R}}$$

where E represents a combined Young's Modulus of Elasticity, H represents a hardness of softer material, $\sigma$ is a root mean square of surface heights, and R represents a radius of curvature of asperity summits.

18. The slider of claim 17, wherein in $\psi$ is within a range of $0.6<\psi<1.0$.

* * * * *